(12) United States Patent
Doig et al.

(10) Patent No.: US 11,115,791 B2
(45) Date of Patent: Sep. 7, 2021

(54) METHOD AND SYSTEM FOR SUPPLYING ADDITIONAL VEHICLE INFORMATION FROM AN ASSET TRACKING SYSTEM

(71) Applicant: BlackBerry Limited, Waterloo (CA)

(72) Inventors: Ian Christopher Drummond Doig, Roquefort les Pins (FR); Stephen John Barrett, Haywards Heath (GB)

(73) Assignee: BlackBerry Limited, Waterloo, CA (US)

( * ) Notice: Subject to any disclaimer, the term of this patent is extended or adjusted under 35 U.S.C. 154(b) by 0 days.

(21) Appl. No.: 15/930,894

(22) Filed: May 13, 2020

(65) Prior Publication Data
US 2020/0382925 A1    Dec. 3, 2020

(51) Int. Cl.
| | |
|---|---|
| *G01B 7/04* | (2006.01) |
| *H04W 4/44* | (2018.01) |
| *H04W 4/35* | (2018.01) |
| *G07C 5/00* | (2006.01) |
| *G07C 5/08* | (2006.01) |
| *G01B 7/02* | (2006.01) |

(52) U.S. Cl.
CPC ............... *H04W 4/44* (2018.02); *G01B 7/04* (2013.01); *G01B 7/042* (2013.01); *G07C 5/008* (2013.01); *G07C 5/0841* (2013.01); *H04W 4/35* (2018.02); *G01B 7/02* (2013.01); *G01B 7/023* (2013.01)

(58) Field of Classification Search
CPC . G01B 7/023; G01B 7/02; G01B 7/04; G01B 7/042
See application file for complete search history.

(56) References Cited

U.S. PATENT DOCUMENTS

| | | | |
|---|---|---|---|
| 2011/0181457 A1* | 7/2011 | Basten | G01B 7/042 342/70 |
| 2014/0297129 A1* | 10/2014 | Lavoie | G01B 21/02 701/41 |
| 2017/0197598 A1* | 7/2017 | Lesher | B60T 8/17551 |
| 2017/0242095 A1 | 8/2017 | Schuh et al. | |

OTHER PUBLICATIONS

Extended European Search Report, EP Application No. 19305707, dated Nov. 26, 2019.

* cited by examiner

*Primary Examiner* — Benyam Haile
(74) *Attorney, Agent, or Firm* — Moffat & Co

(57) ABSTRACT

A method at a first computing device within an Intelligent Transportation System for vehicle length reporting, the method including receiving, at the computing device, a position from a second computing device; finding position information for the first computing device; calculating a difference between the position found for the first computing device and the position reported from the second computing device; and using the difference for vehicle length reporting.

25 Claims, 11 Drawing Sheets

METHOD AND SYSTEM FOR SUPPLYING ADDITIONAL VEHICLE INFORMATION FROM AN ASSET TRACKING SYSTEM

FIELD OF THE DISCLOSURE

The present disclosure relates to Intelligent Transportation System messaging, and in particular relates to vehicle or platoon length reporting in Intelligent Transportation System messaging.

BACKGROUND

Intelligent Transportation Systems (ITSs) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure such as on road verges, on bridges or at intersections, and for other users of the transportation system including pedestrians or bicyclists.

An ITS station is any entity that may provide ITS communications, including vehicles, infrastructure components, mobile devices, among other options. Such ITS communications currently provide information regarding the vehicle, its direction of travel, the size of the vehicle, among other similar information.

However, with regard to total vehicle length, a tractor unit (i.e. a towing vehicle) may not know the length or parameters of the trailer that is being towed. While ITS capable trailers may, in the future, have the capability to transmit their own ITS messaging, for the foreseeable future ITS systems will not be deployed on trailers, and once deployed there will be many legacy trailers within the transportation system. In addition, whilst some trailers may be able to convey their dimensions over a wired bus between the tractor and trailer this facility will not always exist. Such trailers that do not have these capabilities may be considered dumb trailers. Furthermore, an ITS equipped tractor unit may frequently connect to different types and dimensions of dumb trailers, and the complete tractor and trailer unit may be sending ITS messaging with inaccurate vehicle dimensions only based on the tractor unit dimensions. Inaccurate vehicle size information will adversely impact safety applications.

BRIEF DESCRIPTION OF THE DRAWINGS

The present disclosure will be better understood with reference to the drawings, in which.

DETAILED DESCRIPTION OF THE DRAWINGS

The present disclosure provides a method at a first computing device within an Intelligent Transportation System for vehicle length reporting, the method comprising: receiving, at the computing device, a reported position from a second computing device; finding position information for the first computing device; calculating a difference between the position found for the first computing device and the position reported for the second computing device; and using the difference for vehicle length reporting.

The present disclosure further provides a first computing device within an Intelligent Transportation System for vehicle length reporting, the first computing device comprising: a processor; and a communications subsystem, wherein the first computing device is configured to: receive a reported position from a second computing device; find position information for the first computing device; calculate a difference between the position found for the first computing device and the position reported for the second computing device; and use the difference for vehicle length reporting.

The present disclosure further provides a computer readable medium for storing instruction code which, when executed by a processor of a first computing device within an Intelligent Transportation System for vehicle length reporting cause the first computing device to: wherein the first computing device is configured to: receive a reported position from a second computing device; find position information for the first computing device; calculate a difference between the position found for the first computing device and the position reported for the second computing device; and use the difference for vehicle length reporting.

In accordance with the embodiments described below, methods and systems for providing total vehicle or platoon length are provided.

Figure 1:
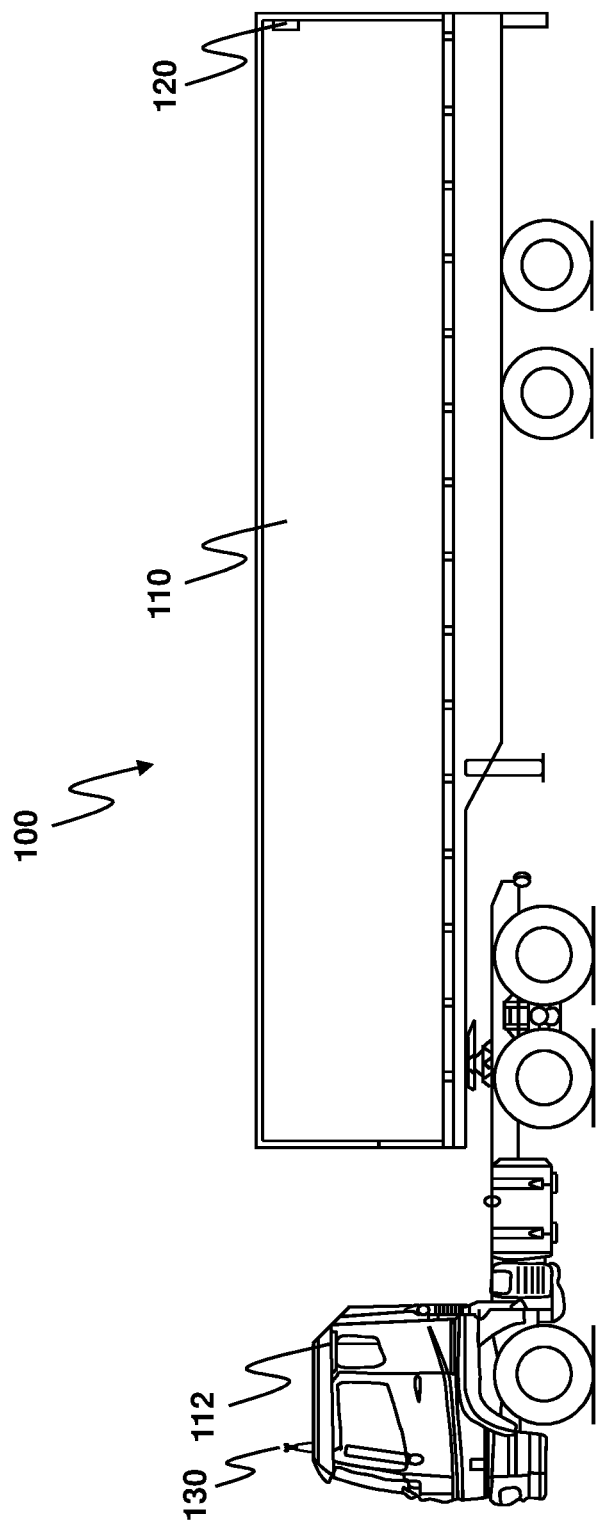
FIG. 1 is a side elevational view of a tractor and trailer unit showing an example placement of an asset tracking device sensor apparatus.

Reference is now made to FIG. 1. In the embodiment of FIG. 1, example truck 100 having a trailer 110 and tractor 112 is shown. In one embodiment, a tag or computing device may be mounted on the back of the trailer. For example, in one embodiment the computing device may be mounted on the back door, or close to the top of the back door or on the rear side wall near the back door of the truck trailer 110. This is shown, for example, with asset tracking device 120 in the embodiment of FIG. 1.

The location of asset tracking device 120 near the rear of the trailer is however only one option for asset tracking. In some embodiments it may be useful to have a plurality of such asset tracking devices within the trailer 110.

The asset tracking devices within trailer 110 may be used alone in some embodiments or may be combined into sets of two or more asset tracking devices and/or external sensors for asset tracking.

Further, in the embodiments of the present disclosure, a trailer 110 is merely used as an example. In other cases, the asset tracking device may be associated with a container capable of being loaded onto a trailer. Thus the use of the term trailer will include containers that are removable from a trailer bed.

Apparatus

Figure 2:
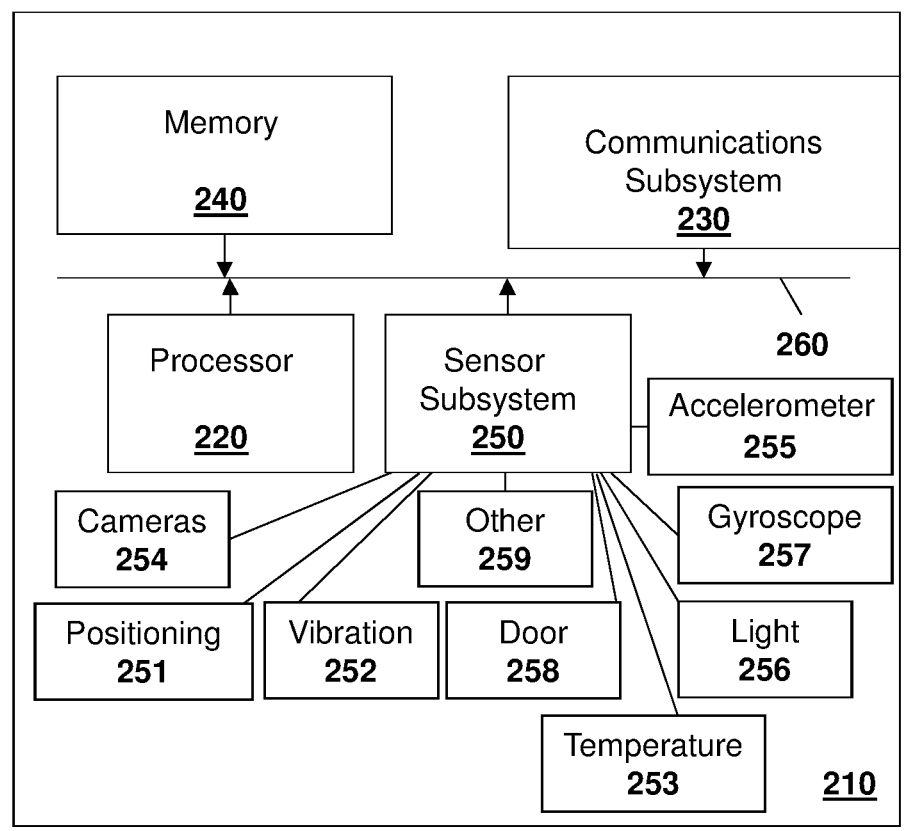
FIG. 2 is block diagram of an example sensor apparatus capable of being used in embodiments of the present disclosure.

One asset tracking device for a vehicle or container is shown with regard to FIG. 2. The asset tracking device of FIG. 2 is however merely an example and other sensing devices could equally be used in accordance with the embodiments of the present disclosure.

Reference is now made to FIG. 2, which shows an example asset tracking device 210. Asset tracking device 210 can be any computing device or network node. Such sensor apparatus or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Asset tracking device 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows asset tracking device 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 230 will be dependent upon the communication network or communication technology on which the sensor apparatus is intended to operate.

Processor 220 generally controls the overall operation of the asset tracking device 210 and is configured to execute programmable logic, which may be stored, along with data, using memory 240. Memory 240 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 240, asset tracking device 210 may access data or programmable logic from an external storage medium (not shown), for example through communications subsystem 230.

In the embodiment of FIG. 2, asset tracking device 210 may utilize a plurality of sensors, which may either be part of asset tracking device 210 in some embodiments or may communicate with asset tracking device 210 in other embodiments. For sensors within asset tracking device 210, processor 220 may receive input from a sensor subsystem 250.

Examples of sensors in the embodiment of FIG. 2 include a positioning sensor 251, a vibration sensor 252, a temperature sensor 253, one or more image sensors/cameras 254, accelerometer 255, light sensors 256, gyroscopic sensors 257, a door sensor 258, and other sensors 259. Other sensors may be any sensor that is capable of reading or obtaining data that may be useful for the asset tracking device 210. However, the sensors shown in the embodiment of FIG. 2 are merely examples, and in other embodiments, different sensors or a subset of sensors shown in FIG. 2 may be used. For example, in some cases the only sensor may be a position sensor.

For example, the position sensor may include a Global Navigation Satellite System (GNSS) receiver, for example a Global Positioning System (GPS) receiver (e.g. in the form of a chip or chipset) for receiving GNSS radio signals transmitted from one or more orbiting GNSS satellites. Although the present disclosure refers expressly to the Global Positioning System, it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system, among others.

Communications between the various elements of asset tracking device 210 may be through an internal bus 260 in one embodiment. However, other forms of communication are possible.

Asset tracking device 210 may be affixed to any fixed or portable platform. For example, asset tracking device 210 may be affixed to shipping containers or truck trailers in one embodiment, as for example described above with regard to FIG. 1.

Such an asset tracking device 210 may be a power limited device. For example, asset tracking device 210 could be a battery-operated device that can be affixed to a shipping container or trailer in some embodiments. Other limited power sources could include any limited power supply, such as a small generator or dynamo, a fuel cell, solar power, energy harvesting, among other options.

In other embodiments, asset tracking device 210 may utilize external power, for example from the battery or power system of a tractor pulling the trailer, via a wiring harness connected to a 7-pin plug, from a land power source for example on a plugged-in recreational vehicle or from a building power supply, among other options. Thus, the asset tracking device 210 may also be connected to a power cord that receives its power from a power source.

External power may further allow for recharging of batteries to allow the asset tracking device 210 to then operate in a power limited mode again. Recharging methods may also include other power sources, such as, but not limited to, solar, electromagnetic, acoustic or vibration charging.

The asset tracking device from FIG. 2 may be used in a variety of environments. One example environment in which the asset tracking device may be used is shown with regard to FIG. 3.

Figure 3:
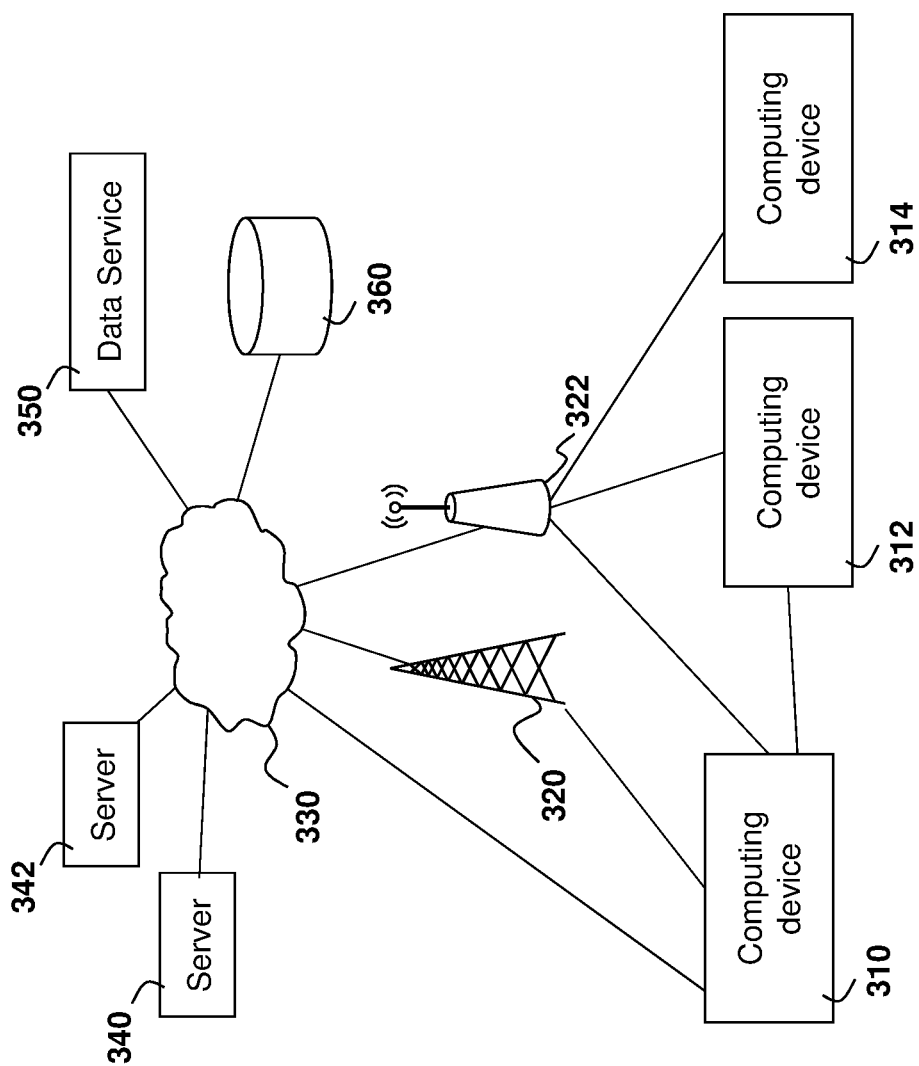
FIG. 3 is a block diagram showing an example environment for the sensor apparatus of FIG. 2.

Referring to FIG. 3, three asset tracking devices, namely asset tracking device 310, asset tracking device 312, and asset tracking device 314 are provided.

In the example of FIG. 3, asset tracking device 310 may communicate through a cellular base station 320 or through an access point 322. Access point 322 may be any wireless communication access point, including, but not limited to a wireless access network such as Wi-Fi.

Further, in some embodiments, asset tracking device 310 could communicate through a wired access point such as Ethernet or fiber, among other options.

The communication may then proceed over a wide area network such as Internet 330 and proceed to servers 340 or 342.

Similarly, asset tracking device 312 and asset tracking device 314 may communicate with servers 340 or server 342 through one or both of the base station 320 or access point 322, among other options for such communication.

In other embodiments, any one of asset tracking devices 310, 312 or 314 may communicate through satellite communication technology. This, for example, may be useful if the asset tracking device is travelling to areas that are outside of cellular coverage or access point coverage.

In other embodiments, asset tracking device 312 may be out of range of access point 322 and may communicate with asset tracking device 310 to allow asset tracking device 310 to act as a relay for communications.

Communication between asset tracking device 310 and server 340 may be one directional or bidirectional. Thus, in one embodiment asset tracking device 310 may provide information to server 340 but server 340 does not respond. In other cases, server 340 may issue commands to asset tracking device 310 but data may be stored internally on asset tracking device 310 until the asset tracking device arrives at a particular location, possibly during a particular time window. In other cases, two-way communication may exist between asset tracking device 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not performed at a location that is closely tied to the location of asset tracking devices 310, 312, 314, etc. For example, the server may be located essentially anywhere so long as it has network access to communicate with asset tracking devices 310, 312, 314, etc.

Server 340 may, for example, be a fleet management centralized monitoring station. In this case, server 340 may receive information from an asset tracking device associated with various trailers or cargo containers, providing information such as the location of such cargo containers, the temperature within such cargo containers, any unusual events including sudden decelerations, temperature warnings when the temperature is either too high or too low, cargo loading within the trailer, the mass of the trailer, among other data. The server 340 may compile such information and store it for future reference. Further, in some cases server 340 may include an association between a tractor and a trailer, where the association is either a current pairing or a future time or geographic location pairing.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription-based service used by server 340 to obtain current road and weather conditions or may be an inventory control system in some cases.

Data repository or database 360 may for example provide information such as image data associated with a particular location, aerial maps, detailed street maps, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more of asset tracking devices 310, 312, or 314 for processing at those asset tracking devices.

Intelligent Transportation System

Intelligent Transportation System software and communication systems are designed to, for example, enhance road safety and road traffic efficiency. Such systems include vehicle to/from vehicle (V2V) communications, vehicle to/from infrastructure (V2I) communications, vehicle to/from network (V2N) communications, vehicle to/from the pedestrian or portable (V2P) communications, and vehicle to network to vehicle (V2N2V). The communications from a vehicle to/from any of the above may be generally referred to as V2X.

Further, other elements in a system may communicate with each other. Thus, systems may include portable to/from infrastructure (P2I) communications, infrastructure to infrastructure (I2I) communications, portable to portable (P2P) communications (also known as peer to peer communications), among others. As used herein, V2X thus includes any communication between an ITS station and another ITS station, where the station may be associated with a vehicle, road side unit, network element, pedestrian, cyclist, animal, among other options. For example, vehicles on a highway may communicate with each other, allowing a first vehicle to send a message to one or more other vehicles to indicate that it is braking, thereby allowing vehicles to follow each other more closely.

Communications between elements of an ITS may further allow for potential collision detection and allow a vehicle with such a device to take action to avoid a collision, such as braking or swerving. For example, an active safety system on a vehicle may take input from sensors such as cameras, RADAR, LIDAR, and V2X, and may act on them by steering or braking, overriding or augmenting the actions of the human driver or facilitating autonomous driving where a human is not involved at all. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Figure 4:
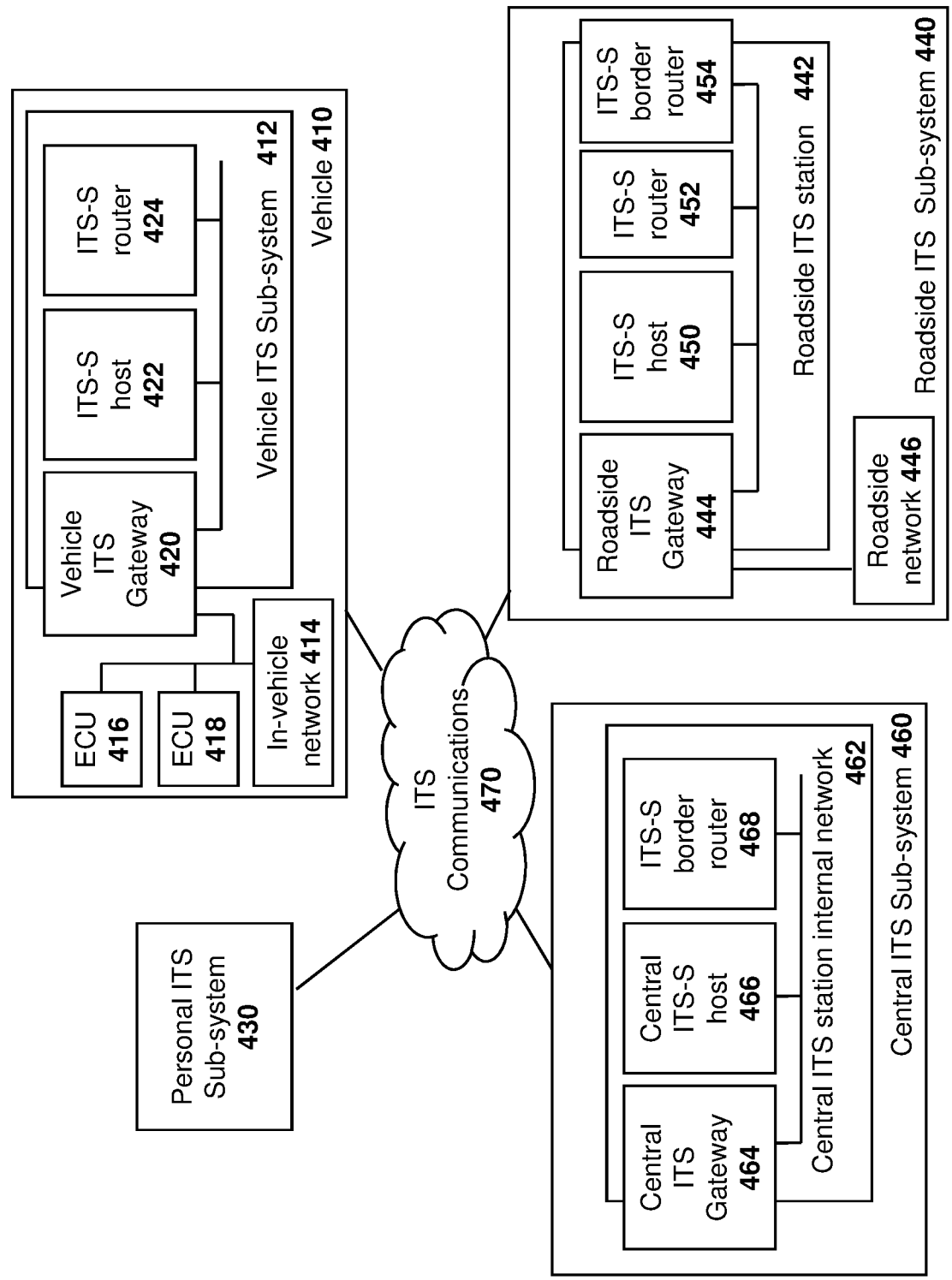
FIG. 4 is a block diagram showing an example intelligent transportation system (ITS) architecture.

Reference is now made to FIG. 4, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 4, a vehicle 410 includes a vehicle ITS sub-system 412. For example, such subsystem may be found within tractor 112, as shown by reference numeral 130 in the embodiment of FIG. 1. Vehicle ITS sub-system 412 may, in some cases, communicate with an in-vehicle network 414. The in-vehicle network 414 may receive inputs from various electronic control unit (ECUs) 416 or 418 in the environment of FIG. 4.

Vehicle ITS sub-system 412 may include a vehicle ITS gateway 420 which provides functionality to connect to the in-vehicle network 414.

Vehicle ITS sub-system 412 may further have an ITS-S host 422 which contains ITS applications and functionality needed for such ITS applications.

Further, an ITS-S router 424 provides the functionality to interconnect different ITS protocol stacks, for example at layer 3. ITS-S router 424 may be capable of converting protocols, for example for the ITS-S host 422.

Further, the ITS system of FIG. 4 may include a personal ITS sub-system 430, which may provide application and communication functionalities of ITS communications (ITSC) in handheld or portable devices, such as personal digital assistants (PDAs), mobile phones, user equipment, among other such devices.

A further component of the ITS system shown in the example of FIG. 4 includes a roadside ITS sub-system 440, which may contain roadside ITS stations which may be deployed on bridges, traffic lights, among other options.

The roadside ITS sub-system 440 includes a roadside ITS station 442 which includes a roadside ITS gateway 444. Such gateway may connect the roadside ITS station 442 with one or more roadside networks 446.

A roadside ITS station 442 may further include an ITS-S host 450 which may contain ITS-S applications and the functionalities needed for such applications.

The roadside ITS station 442 may further include an ITS-S router 452, which provides the interconnection of different ITS protocol stacks, for example at layer 3.

The roadside ITS station 442 may further include an ITS-S border router 454, which may provide for one or both of the interconnection of two protocol stacks and the interconnection to an external network.

A further component of the ITS system in the example of FIG. 4 includes a central ITS sub-system 460 which includes a central ITS station internal network 462.

Central ITS station internal network 462 includes a central ITS gateway 464, a central ITS-S host 466 and an ITS-S border router 468. Central ITS gateway 464, central ITS-S host 466 and ITS-S border router 468 have similar functionality to the Roadside ITS gateway 444, ITS-S host 450 and ITS-S border router 454 of the roadside ITS station 442.

Communications between the various components may occur through an ITS peer-to-peer communications network or via network infrastructure 470.

From FIG. 4 above, V2X communications may be used for both road safety and for improving efficiency of road transportation, including movement of vehicles, reduced fuel consumption, among other factors.

V2X messages are defined by the European Telecommunications Standards Institute (ETSI) fall into two categories, namely Cooperative Awareness Message (CAM) and Decentralized Environmental Notification Message (DENM). A CAM message is a periodic, time triggered message that may provide status information to neighboring ITS stations. The broadcast is typically over a single hop and the status information may include a station type, position, speed, heading, among other options. Optional fields in a CAM message may include information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include details about the causing event, detection time, event position, event speed, heading, among other factors. DENM messages may be sent, for example, up to 20 times per second over a duration of several seconds.

Similar concepts apply to the Dedicated Short-Range Communications (DSRC)/Wireless Access in Vehicular Environments (WAVE) system in which a Basic Safety Message (BSM) is specified instead of the CAM/DENM messaging from ETSI.

For ETSI, the Cooperative Awareness basic service stores at least the following information for the CAM originated ITS-S operation: CAM generation time; ITS-S position as included in the CAM; ITS-S speed as included in the CAM; ITS-S heading as included in the CAM.

CAM messages that are received at an asset tracking device generally are in a particular format. For example, a CAM message includes a header, which is for example described in Appendix B.1 in ETSI EN 302 637-2 V1.3.1, September 2014. The B.1 header is described in Table 1 below.

TABLE 1

| B.1 Header from ETSI EN 302 637-2 | |
| --- | --- |
| Description | ITS Protocol Data Unit (PDU) header of the CAM. This DF includes DEs for the CAM protocolVersion, the CAM message type identifier messageID and the station identifier stationID of the originating ITS-S. The DE protocolVersion is used to select the appropriate protocol decoder at the receiving ITS-S. This DE messageID should be harmonized with other V2X message identifier definitions. |
| Data setting and presentation requirements | For the present document, the value of the DE protocolVersion shall be set to 1. For CAM, the DE messageID shall be set to cam(2). This DF shall be presented as specified in ETSI TS 102 894-2 ItsPduHeader. |

The station type is described in CAM messages in Appendix B.18, which is shown in Table 2 below.

TABLE 2

| B.18 stationType from ETSI EN 302 637-2 | |
| --- | --- |
| Description | Station type of the originating ITS-S. |
| Data setting and presentation | The DE shall be presented as specified in ETSI TS 102 894-2 |

TABLE 2-continued

B.18 stationType from ETSI EN 302 637-2

| | |
|---|---|
| requirements | StationType.<br>For vehicle ITS-Ss the value of this DE shall be set to one out of the values 3 to 10. |

The reference position is described in CAM messages in Appendix B.19, which is shown in Table 3 below.

TABLE 3

B.19 referencePosition from ETSI EN 302 637-2

| | |
|---|---|
| Description | Position and position accuracy measured at the reference point of the originating ITS-S. The measurement time shall correspond to generationDeltaTime. If the station type of the originating ITS-S is set to one out of the values 3 to 11 the reference point shall be the ground position of the centre of the front side of the bounding box of the vehicle. The positionConfidenceEllipse provides the accuracy of the measured position with the 95% confidence level. Otherwise, the positionConfidenceEllipse shall be set to unavailable. If semiMajorOrientation is set to 0° North, then the semiMajorConfidence corresponds to the position accuracy in the North/South direction, while the semiMinorConfidence corresponds to the position accuracy in the East/West direction. This definition implies that the semiMajorConfidence might be smaller than the semiMinorConfidence. |
| Data setting and presentation requirements | The DE shall be presented as specified in ETSI TS 102 894-2 ReferencePosition. |

In the messaging of Table 3 above, when the tractor gives its position it will be that of the very front of the tractor. This reported geolocation reference position is the location of the antenna plus an offset, which may be configured at the time the vehicle is manufactured or the system is installed, among other options. In particular, according to Table 3, a position may be included when there is a 95% confidence level that the true location of the middle of the front of the tractor is within a given ellipse drawn around the pinpoint broadcast location. As defined, for example in ETSI TR 102 273-1-1, v.1.2.1, December 2001, a "confidence level" is the probability of the accumulated error of a measurement being within the stated range of uncertainty of measurement. Here the stated range is 95%. A 95% confidence level is further defined in ETSI TBR 23, March 1998 as 1.96 times the total standard deviation, based on the Student t factor, where the Student t factor is a continuous probability distribution that arises when estimating the mean of a normally distributed population in situations where the sample size is small and the population standard deviation is unknown.

When an asset tracking device is at the back of a trailer then the computation of combined tractor/trailer length can be done by subtracting the position of the front of the tractor from the position of the back of the trailer when it is determined that the tractor and trailer are aligned in the same direction. For example, reference is now made to FIG. 5, which shows a diagram from section 6 of ETSI EN 302 890-2 V0.0.2, "Intelligent Transport Systems (ITS); Facilities Layer function; Part 2: Facility Position and Time management (PoTi) [Release 2]" (2019-01).

Figure 5:
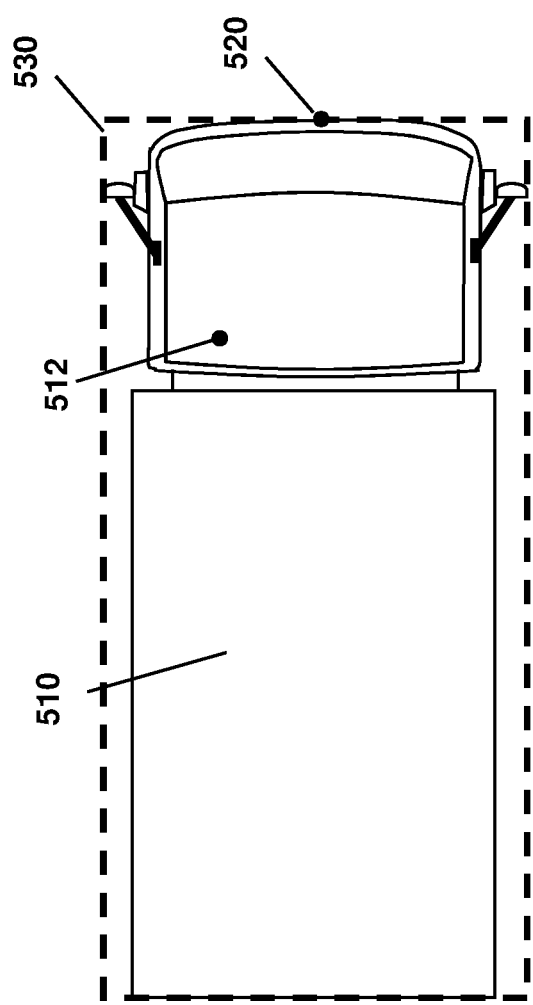
FIG. 5 is a top plan view of a truck showing a GNSS antenna position and a geolocation reference position.

In accordance with the embodiment of FIG. 5, a truck or tractor 510 includes a GNSS antenna position 512. However, the reported geolocation reference position 520 corresponds with the front side, relative to a driving direction, middle point of a rectangular box 530 enclosing the truck.

The heading of the sending vehicle found in CAM messages is described in Appendix B.21 and is shown in Table 4 below.

TABLE 4

B.21 heading from ETSI EN 302 637-2

| | |
|---|---|
| Description | Heading and heading accuracy of the vehicle movement of the originating ITS-S with regards to the true north. The heading accuracy provided in the DE headingConfidence value shall provide the accuracy of the measured vehicle heading with a confidence level of 95%. Otherwise, the value of the headingConfidence shall be set to unavailable. |
| Data setting and presentation requirements | The DE shall be presented as specified in ETSI TS 102 894-2 Heading. |

The speed of the sending vehicle found in CAM messages is described in Appendix B.22 and is shown in Table 5 below.

TABLE 5

B.22 speed from ETSI EN 302 637-2

| | |
|---|---|
| Description | Driving speed and speed accuracy of the originating ITS-S. The speed accuracy provided in the DE speedConfidence shall provide the accuracy of the speed value with a confidence level of 95%. Otherwise, the speedConfidence shall be set to unavailable. |
| Data setting and presentation requirements | The DE shall be presented as specified in ETSI TS 102 894-2 Speed. |

NOTE:
There might be a difference between the speed in moving direction and the driving speed.

The vehicle length of the sending vehicle is found in CAM messages and is described Appendix B.35, as shown in Table 6 below.

TABLE 6

B.35 vehicleLength from ETSI EN 302 637-2

| | |
|---|---|
| Description | This DF includes:<br>vehicleLengthValue: Vehicle length of the vehicle ITS-S that originates the CAM. If there are vehicle attachments like a trailer, or overhanging attachments like a crane, that extend the vehicle length to the front and/or rear; then the vehicleLengthValue shall provide the length for the vehicle including the attachments.<br>vehicleLengthConfidenceIndication: indication of whether trailer is detected to be present and whether the length of the trailer is known. |
| Data setting and presentation requirements | The DF shall be presented as specified in ETSI TS 102 894-2 VehicleLength. |

The length of the vehicle may, in some cases, be determined and reported based on a geolocation reference position for the vehicle, as for example described in Section 6 of ETSI EN 302 890-2V0.0.2, "Intelligent Transport Systems (ITS); Facilities Layer function; Part 2: Facility Position and Time management (PoTi); [Release 2]", 2019-01.

The vehicle width of the sending vehicle in CAM messages is described in Appendix B.35, as shown in Table 7 below.

TABLE 7

| B.36 vehicleWidth from ETSI EN 302 637-2 | |
| --- | --- |
| Description | Vehicle width, measured of the vehicle ITS-S that originates the CAM, including side mirrors. |
| Data setting and presentation requirements | The DE shall be presented as specified in ETSI TS 102 894-2 VehicleWidth. |

From Tables 1 to 7 above, various information with regard to a vehicle may be determined based on the CAM messages transmitted from such vehicle.

Asset Tracking Device Assistance to Determine Vehicle length for ITS (V2X) message In accordance with the embodiments of the present disclosure, an asset tracking device connected to a trailer can be used as part of a length calculation of the tractor and trailer combination, thus allowing for more accurate V2X reporting.

In a first embodiment, an ITS tractor unit may provide V2X messages. The asset tracking device on the trailer may identify the tractor unit that the trailer is attached to and may then determine its own location.

The asset tracking device may report its position to the ITS tractor unit, which may then use the position to calculate the trailer length and therefore the entire length of the tractor and trailer unit. The ITS tractor unit may thereafter use the corrected length in V2X reporting.

The asset tracking device in this case would be part of the ITS system through its capability to receive V2X messages. Further, in some cases the asset tracking device could also transmit V2X messages.

Figure 6:
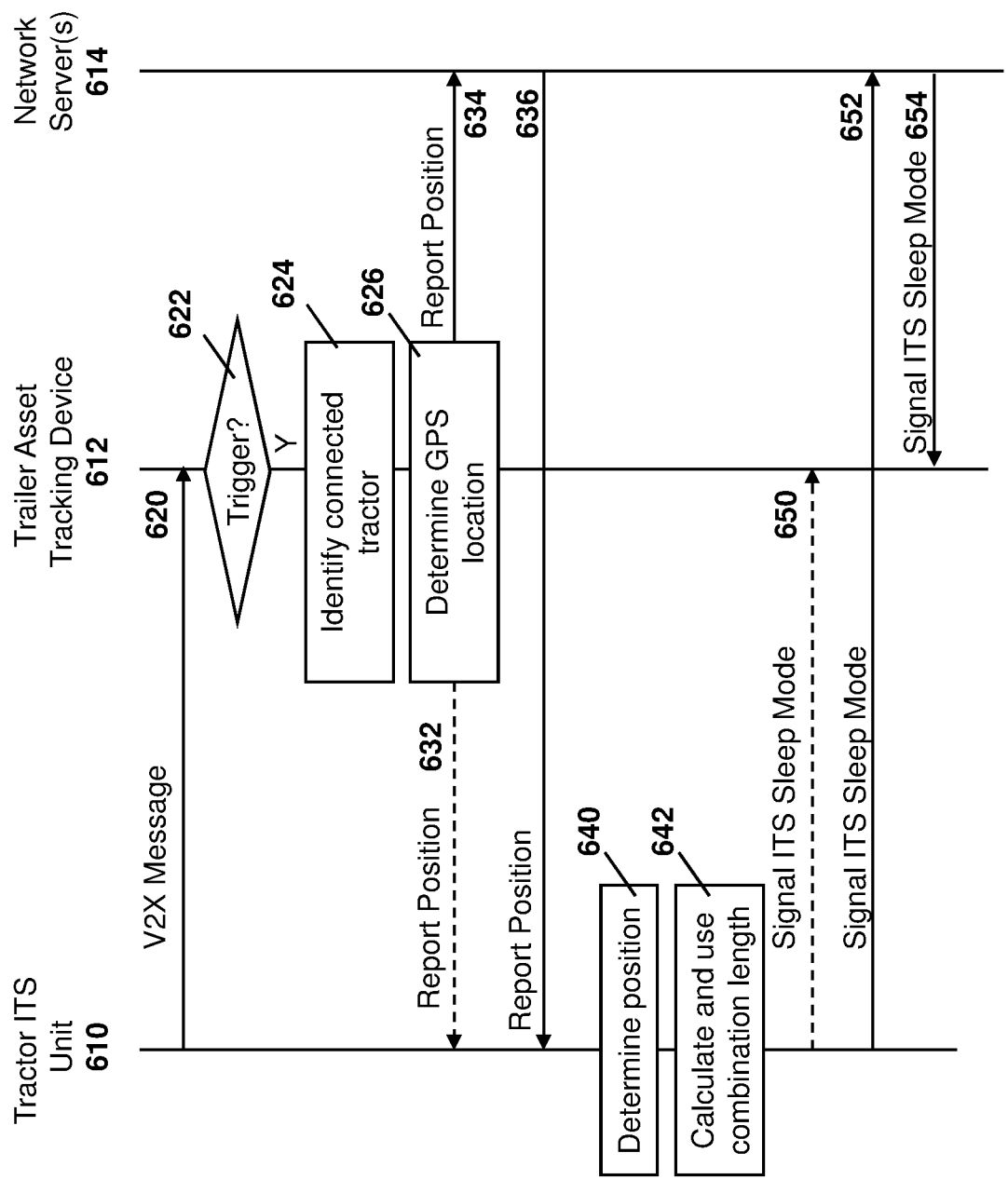
FIG. 6 is a dataflow diagram showing messaging and processes for various system components to allow a tractor ITS unit to calculate total vehicle length.

In particular, reference is now made to FIG. 6. In the embodiment of FIG. 6, a tractor ITS unit 610 communicates with a trailer asset tracking device 612. As indicated above, the trailer asset tracking device 612 and the tractor ITS unit 610 may communicate with one or more network servers 614.

In accordance with the embodiments described herein, in some cases one or more network servers communicate with the asset tracking device 612. The one or more network servers that communicate with trailer ITS unit 610 and asset tracking device 612 may be the same server or different servers. If different, the servers may communicate, either directly or indirectly with each other to allow communication between the trailer asset tracking device 612 and the tractor ITS unit 610.

The tractor ITS unit 610 transmits V2X messages 620 pursuant to ITS requirements. Such V2X messages 620 generally include a vehicle length, heading, and speed for the vehicle, among other information.

The trailer asset tracking device 612 may rely on a trigger condition 622 to begin a process to transmit its length. For example, a trigger condition may be that the trailer has been stationary for a threshold time period. In other cases, the trigger may be the detection of movement after the trailer has been stationary for a certain amount of time. In other cases, the trigger may be the entering or exiting of the geofenced area. For example, the geofenced area may indicate a trailer yard where the trailer is loaded, unloaded, or stored, which may indicate that the trailer could be unhooked and hooked to a different tractor.

In other cases the trigger at block 622 may be that the V2X message provides that the vehicle LengthConfidenceIndication indicates that the tractor doesn't know the length of the trailer.

Other examples of trigger conditions would be apparent to those skilled in the art having regard to the present disclosure.

Once the trigger condition has been met, the process proceeds to block 624 in which the trailer asset tracking device identifies the tractor that it is connected to. This could be done in several ways.

In a first embodiment, the tractor unit may be identified at the asset tracking device through manual input. For example, an administration may input the association at a central database. Thereafter, the tractor unit connected to the trailer may be identified through provisioning by the asset tracking service. Such provisioning may, for example, provide an identifier or set of identifiers for the tractor unit towing the trailer to the asset tracking device.

In other cases, the tractor ITS unit 610 may communicate directly with the asset tracking device 612.

In other cases, the asset tracking device may activate its ITS receiver, for example upon matching the trigger condition. The ITS receiver on the asset tracking device obtains an ITS message (for example a BSM/CAM) from the strongest source. In many cases, the strongest source may be from the vehicle that is associated with the asset tracking device. However, in other cases, the strongest signal may be from a vehicle that is trailing the vehicle associated with the device, from a roadside unit, or from other devices. In this case, the connected tractor may be identified over a period of time where the strongest signal or a consistently strong signal originates from the tractor, and whereas other vehicles or Road side units may move away from the trailer.

In some cases, in addition to position information, heading information, speed information, station type information, among other information may be obtained from the BSM/CAM message. This information could further be used to identify the tractor based on readings obtained at the asset tracking device.

For example, a compass on the asset tracking device may be compared with the direction information found in the received V2X message.

In other cases, rather than a compass, the asset tracking device may filter out messages in which the acceleration is different or inconsistent. This may be achieved by use of an accelerometer sensor in the asset tracking device and by comparison of the acceleration computed using this sensor with the differential of velocity obtained from multiple V2X messages having the same certificate identifier.

In some cases, the asset tracking device may obtain a location, direction and/or speed using the GPS location from a GPS receiver. The comparison of the position fix/direction/speed from the GPS location with the ITS message may be used for a variety of purposes. In one case, it may help to associate the ITS station that is pulling the trailer with the asset tracking device. The asset tracking device can improve its confidence that, or even infer that, messages containing a certain certificate identifier are produced by a tractor ITS unit vehicle towing the trailer if the absolute difference in distance between the GPS position of the asset tracking device and the position reported by the ITS station remains the same over multiple observation periods, or if the heading reported in the CAM/BSM message is the same as the heading that the asset tracking device records, or if the velocity reported in in the CAM/BSM message is the same as the velocity that the asset tracking device records, or if the station type in the CAM/BSM message corresponds to the expected station type of a towing vehicle where that expected station type is pre-stored in the asset tracking device. Confidence that the source of CAM/BSM messages with a given certificate identifier are coming from a tractor unit, with the above methods, increases if the asset tracking device is moving or as the count of the number of times that the same correlations are observed increases.

In other cases, multiple BSM/CAM messages may be received from multiple sources and a search made amongst these messages for the certificate identifier that has been received most frequently in the past, and which is therefore most likely to have been included in a message generated by a tractor ITS unit.

Based on the above, the asset tracking device on the trailer first may find the trailer is attached to a tractor (producer of V2X messages) and then that the identity of this associated tractor is recorded (could be through pseudonyms, or any other hard coded identity provided in the V2X message). After this, the asset tracking device may provide this identity either to asset tracking server, so asset tracking server can forward the information to the correct tractor. In other cases, the asset tracking device may send a direct mode message to the tractor with an identifier, and the appropriate tractor knows whether or not the message is meant to be interpreted by itself or by another tractor.

In some cases, an ITS station may have a plurality of certificates. For example, the use of a plurality of certificates has been proposed in order to protect privacy and prevent an ITS station from being tracked. In this case, a vehicle may be pre-provisioned with a plurality of certificates, which may then be cycled through when providing ITS messages.

In order to help identify an ITS station associated with an asset tracking device, the asset tracking device may in some cases store a list of the certificate identifiers for the tractor unit.

The list of certificate identifiers for the tractor unit may, in some cases, be provisioned to the asset tracking device. In this case, the asset tracking device may receive and populate its list with the received information and may thereafter use this information to identify BSM/CAM messages from the tractor unit associated with the asset tracking device.

In other cases, the asset tracking device may build a list of certificate identifiers observed over time and may then reference this list to find the V2X signal from the tractor ITS unit.

Once the tractor ITS unit for the tractor towing the trailer is identified at block 624, the process proceeds to block 626 in which the asset tracking device may determine its GPS location. The determination of the GPS location may be done periodically, for example every 10 ms, and then reported to the tractor ITS unit 610. For example, the reporting may be done directly between the trailer asset tracking device 612 in the tractor ITS unit 610, as shown by message 632. This direct communication may, for example, utilize an IP connection between the two units. In other cases, the reporting may be done by sending a V2X signal. In some cases, direct communication will introduce a lag and therefore the reported position may include a timestamp for the reported position which may then be compared with positioning taken at the tractor ITS unit at the same time. In practice, the "same time" would be within a threshold time period between the two readings, for example 1 ms or less.

However, if direct communication is not possible, then the position may be reported utilizing network service 614. For example, the GPS location may be reported in message 634 to network servers 614 which may then provide the reported position in message 636 to the tractor ITS unit 610.

Message 632 or message 634 could also include an indication that the location measurement is made from an asset tracking device that is at the very back of the trailer. Further, the indication may be provided with 95% confidence level that the true location of the middle of the back of the trailer is within a given ellipse drawn around the pinpoint broadcast location. In other cases, the asset tracking device could perform an adjustment in reported location so that position corresponds to the back of the trailer even if the asset tracking device is not mounted on the very back. In particular, the reported geolocation reference position is the location of the GNSS antenna plus an offset, which may be configured at the time the system is installed, among other options.

Further message 632 or message 634 could also include the width of the trailer (if available), and an indication that the trailer is of symmetrical proportions about the towing point (if available). The location measurement might also need to include some confidence ellipse, pursuant to ETSI-ITS specifications.

As will be appreciated by those skilled in the art, the reporting through a network service will introduce a lag and therefore the reported position will typically include a timestamp for the reported position which may then be compared with positioning taken at the tractor ITS unit at the same time. In practice, the "same time" would be within a threshold time period between the two readings, for example 1 ms or less.

Specifically, the tractor ITS unit 610 may determine its position at block 640 and store such position with time stamps. In some cases, the GPS location at the tractor ITS unit and the GPS location at the asset tracking device may be compared based on the timing of the two GPS position fixes. In one method the asset tracking device could determine from multiple V2X messages 620, absolute times at which the tractor ITS unit is making its position fixes, and also the period with which repeated position fixes are being reported in V2X messages 620. This enables the asset tracking device to determine a future time, for example, that occurs in a few reporting periods hence, at which the asset tracking device should make its position fix, such that the making of the asset tracking device's position fix is synchronised with the expected time that the ITS tractor unit will be making its position fix. In another method the making of position fixes in the tractor's ITS unit and in the asset tracking device are not synchronised, however, the asset tracking device makes multiple periodic measurements and an interpolation is performed either at the asset tracking device or at the tractor ITS unit to determine the position that the asset tracking device was expected to have been in at the time instant corresponding to that at which the location fix was made by the tractor ITS unit. In other cases, the two position fixes may be taken while the vehicle is stationary, in which case the timing between the GPS position fixes on the tractor ITS unit and the trailer do not need to be strictly coordinated. For example, when hooking together, an accelerometer or bump sensor within the trailer may detect the bump from the hookup and start reporting the position of the trailer. Using these methods, providing that the tractor and trailer are spatially arranged in a straight line then the two location fixes, which either actually were made at the same time or which were computationally determined to have occurred at the same time, can be vector subtracted from one another so that the length of the vector can be used to give the length of the vehicle.

In some cases, however, the tractor and the trailer may not be positioned linearly when being connected. For example, if the tractor is at an angle to the trailer when being connected, the distance between the asset tracking device and the tractor ITS unit may be different than when the tractor starts pulling the trailer in a straight direction. In this case, a plurality of measurements may be taken and used to find the most common length or the longest length.

In some cases, the vehicle length may be calculated when the vehicle stops, for example at a stop sign or a traffic light.

Further, in some cases the asset tracking device or the trailer ITS unit may have velocity vectors which may indicate that that the vehicle is turning a corner. These velocity vectors made indicate to the asset tracking device or ITS unit not to perform calculations until the vehicle is straightened out.

Other parameters for when to take readings or when to avoid readings will be known by those skilled in the art having regard to the above.

Such calculation of the length may be done, for example, in block 642 and may involve using one or a plurality of differences between the position at the tractor ITS unit 610 and trailer asset tracking device 612.

In some cases, once the length has been calculated, in order to save battery power on the asset tracking device, the tractor ITS unit 610 may signal the asset tracking device 612 to enter a sleep mode. In this case, the sleep mode turns off an ITS unit at the asset tracking device. If direct communication exists between tractor ITS unit 610 and trailer asset tracking device 612, the signaling to enter the sleep mode may be done directly, as for example shown with message 650. In other cases, the signaling to enter the sleep mode may be done through one or more network servers 614, as for example shown with messages 652 and 654.

If an ITS unit at the asset tracking device 612 enters a sleep mode, the tractor ITS unit 612 or network server 614 may, in some cases, signal at a future time to awaken to perform the process of FIG. 6 again to verify the vehicle length. In other cases, a trigger at the asset tracking device 612 may occasionally wake the ITS radio at the asset tracking device to perform the process of FIG. 6 again. For example, such trigger may be a timer, or may be based on sensor readings at the asset tracking device 612.

While the embodiment of FIG. 6 includes an identification of the tractor connected to the trailer asset tracking device at block 624, in some cases this step may be omitted. For example, if the position is being reported through network service, the network service may know the association between the tractor ITS unit and the trailer asset tracking device. In this case, it may not be necessary to identify the connected tractor at the asset tracking device but rather the association between the tractor and the trailer may be done through knowledge at the network servers.

Based on the above, the embodiment of FIG. 6 includes an asset tracking device reporting its position and the tractor ITS unit calculating a total vehicle length based on the reported position of the asset tracking device. Once the vehicle length is calculated, the tractor ITS unit may then use that length in future V2X messages.

Asset Tracking Device Determines Vehicle Length for ITS (V2X) Messages

In a further embodiment, if a trailer is connected to a tractor, the asset tracking device in the trailer receives V2X messages from the ITS unit within the tractor. The asset tracking device can then determine its own relative location to that of the tractor unit and calculate whether the broadcast message "vehicle length" is correct or not. If not, the asset tracking device may facilitate a correction. Conversely, if the transmitted ITS message contains the correct vehicle length, the asset tracking device may thereafter deactivate its V2X capability.

Again, the asset tracking device in this case would be part of the ITS system through its capability to receive V2X messages. Further, in some cases the asset tracking device could also transmit V2X messages.

Figure 7:
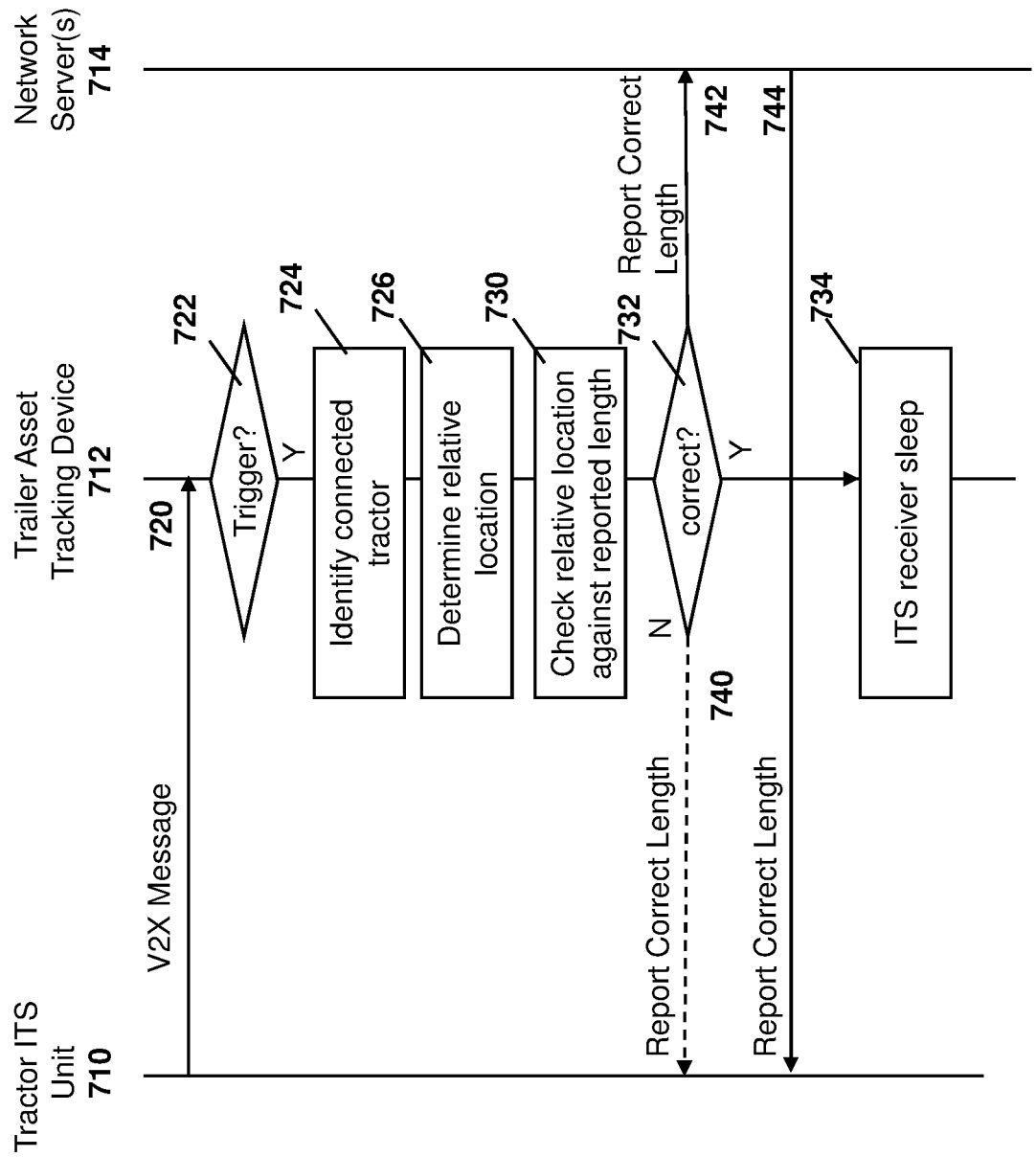
FIG. 7 is a dataflow diagram showing messaging and processes for various system components to allow an asset tracking device to calculate total vehicle length.

In particular, reference is now made to FIG. 7. In the embodiment of FIG. 7, a tractor ITS unit 710 may communicate, either directly or indirectly with a trailer asset tracking device 712. Indirect communication may involve one or a plurality of network servers 714.

A tractor ITS unit 710 may be transmitting V2X messages, as shown by message 720 in the embodiment of FIG. 7.

Upon a trigger event 722, the trailer asset tracking device 712 may begin to listen for the V2X messages 720. Either utilizing information within the V2X message 720 or through some other means as described above with regard to block 624, the asset tracking device 712 may identify the trailer that it is connected with, as shown at block 724. For example, the tractor may be identified through a pseudonym identifier or permanent identifier if available, for example as provisioned on the asset tracking device 712 or received through a connection with a network server. In other cases, orientation and signal strength of the V2X signal may be used to identify the tractor. In other cases, other identifiers within parameters provided in the V2X message, such as speed, acceleration, location, among others, may show a correlation over time with sensor measurements at the asset tracking device 712.

The process at the asset tracking device 712 then proceeds to block 726 in which the relative location of the asset tracking device with regard to the tractor is determined. This may be done in several ways. In one embodiment, the timing of the positioning updates may be synchronized between the asset and the tractor. For example, if the V2X message includes a timestamp at which the location measurement was made, then the asset tracking device can then take a position fix and compare its position at a similar timestamp to that associated with the position reported in the V2X message. The similar timestamp may be within a threshold time difference between the time of position fix and the time reported in the V2X message. In one method the asset tracking device could determine from multiple V2X messages 720, absolute times at which the tractor ITS unit is making its position fixes, and also the period with which repeated position fixes are being reported in V2X messages 720. This enables the asset tracking device to determine a future time, for example, that occurs in a few reporting periods hence, at which the asset tracking device should make its position fix, such that the making of the asset tracking device's position fix is synchronised with the expected time that the ITS tractor unit will be making its position fix.

In another method the making of position fixes in the tractor's ITS unit and in the asset tracking device are not synchronised, however, the asset tracking device makes multiple periodic measurements and an interpolation may be performed to determine the position that the asset tracking device was expected to have been in at the time instant corresponding to that at which the location fix was made by the tractor ITS unit.

In other cases, the position update may be taken while the vehicle is stationary. For example, the trigger at block 722 may be a bump sensor or an accelerometer indicating that the trailer has been connected to a tractor. At this point, the asset tracking device may take a position fix and compare the position with that reported in the V2X message being transmitted by the tractor ITS unit 710.

In other cases, the position fix may be taken while, for example, the vehicle is stationary. For example, a vehicle leaving a trailer yard may encounter stop signs or traffic lights and the position fix may be taken while the vehicle is stopped at those stop signs or traffic lights.

In the cases where the vehicle is stationary, the timing between the GPS position fixes on the tractor ITS unit and the trailer do not need to be strictly coordinated.

Other ways to synchronize the timing for the position fix would be apparent to those skilled in the art having regard to the present disclosure.

Using these methods, providing that the tractor and trailer are spatially arranged in a straight line then the two location fixes, which either actually were made at the same time or which were computationally determined to have occurred at the same time, can be vector subtracted from one another so that the length of the vector can be used to give the length of the vehicle.

From block 726, the process at the asset tracking device 712 proceeds to block 730 in which the relative location as determined at block 726 is compared against the reported length in the V2X message received from the tractor ITS unit 710. The asset tracking device can, for example, determine its estimate of the length of the vehicle by determining the length of the vector between the position reported in the V2X message, which corresponds to the very front of the vehicle, and the time synchronized measurement of position determined at the asset tracking device, which corresponds to the very back of the trailer or container.

The process then proceeds to block 732 where a check is made to determine whether the reported length is correct. If yes, then the ITS receiver may proceed into a sleep state, shown at block 734.

Conversely, if the reported length is not correct, then the asset tracking device 712 may attempt to correct the length reported by the tractor ITS unit 710.

If a direct connection exists between the asset tracking device 712 and the tractor ITS unit 710, then a communication between the asset tracking device 712 and tractor ITS unit 710 may be made to indicate the correct length, as shown by message 740.

In other cases, message 740 may be sent as a V2X communication from the asset tracking device 712. In this case, the tractor ITS unit 710 may receive the V2X message 740, may associate the trailer with the tractor unit and therefore determine that a corrected length is being provided in V2X message 740. In this case, the tractor ITS unit 710 may use a similar process to that described for block 724 to identify the correlation between the asset tracking device and the tractor ITS unit. The asset tracking device may also include within a V2X message a destination address for that V2X message, so that the tractor unit knows whether the length correction is intended for itself. This destination address could, for example comprise or be derived from any identifier that the tractor unit has itself been using in the past, for example a certificate pseudonym identifier or a Layer 2 identifier.

Alternatively, the length correction may be sent through network servers 714. This is shown, for example with message 742 between the asset tracking device 712 and the network servers 714. The network servers 714 may then provide the corrected length in message 744 to the tractor ITS unit 710.

For example, the network servers 714 may include an asset tracking server associated with the asset tracking device 712. Further, such asset tracking server may communicate with a V2X server that can communicate with tractor ITS unit 710.

However other options with regard to servers are within the scope of the present disclosure.

After receiving either message 740 or 744, the tractor ITS unit 710 may then start using the corrected vehicle length.

If an ITS unit at the asset tracking device 712 enters a sleep mode at block 734, a trigger at the asset tracking device 712 may occasionally wake the ITS radio at the asset tracking device to perform the process of FIG. 7 again. For example, such trigger may be a timer, or may be based on sensor readings at the asset tracking device 712. In other cases, a signal from the tractor ITS unit 710 or network server 714 may cause the ITS receiver at the asset tracking device 712 to wake up.

Therefore, in accordance with the embodiment of FIG. 7, it is the asset tracking device 712 that determines whether the length reporting is correct or not, and if not, the asset tracking device 712 attempts to correct the reported length.

With all of the above techniques, the asset tracking device may take into account uncertainty in the location of the mid-front of the vehicle as provided by the tractor. In particular, as described in Table 3 above, uncertainty might be specified as a 95% confidence level that the true location of the middle of the front of the tractor is within a given ellipse drawn around the pinpoint broadcast location. For example, if the asset tracking determines that the broadcast length is incorrect for any possible mid-front of vehicle position within this ellipse, then that would trigger the asset tracking device to provide a correction. Otherwise the asset tracking device would not provide a correction.

Server Length Correction

In a further embodiment, a server may have details of the association between the tractor and the trailer. In this case, an asset tracking device may inform an asset tracking server of a trigger condition being met. The asset tracking server may then perform a lookup of the trailer details associated with the particular asset and supply this to the tractor for use in ITS messaging.

Figure 8:
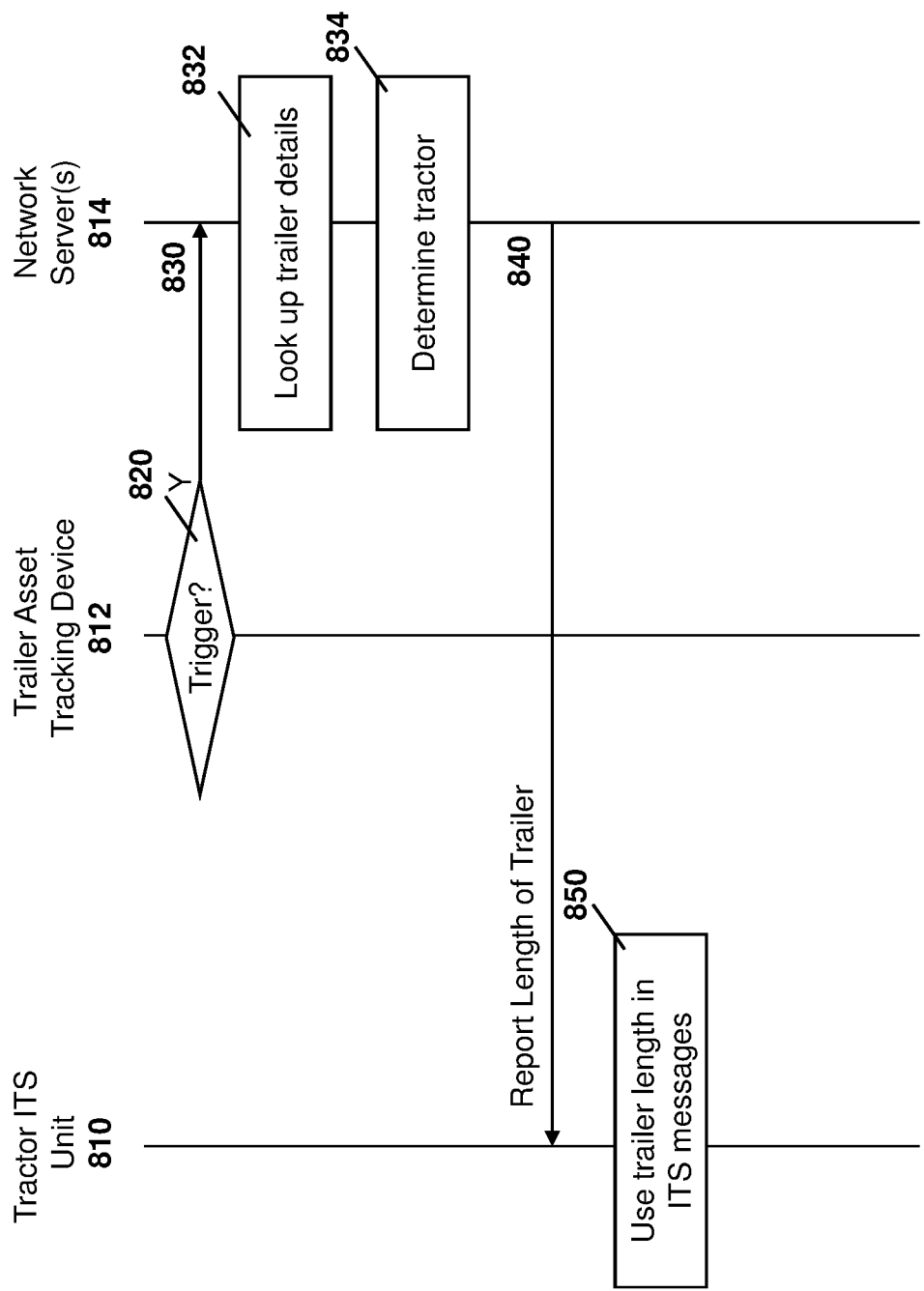
FIG. 8 is a dataflow diagram showing messaging and processes for various system components to allow one or more network servers to calculate and report total vehicle length.

For example, reference is now made to FIG. 8. In the embodiment of FIG. 8, a tractor ITS unit 810 is associated with a trailer asset tracking device 812. One or more network servers 814 may communicate with each or both of tractor ITS unit 810 and trailer asset tracking device 812.

The trailer asset tracking device 812 may monitor for a trigger condition at block 820. For example, the trigger condition may be that the asset is moving. In other cases, the trigger condition may be the entering or leaving of a geofenced area. In other cases, the trigger condition may be a combination of a timer and an accelerometer reading. For example, if the trailer has been sitting idly longer than 30 minutes, and then starts moving, this may indicate the trigger condition. Other options for a trigger condition would be apparent to those in the art having regard to the present disclosure.

If a trigger condition is detected at block 820, then a message 830 may be provided to a network server 814. Message 830 may indicate that the trigger condition has been met and in addition there will be a means by which the server can associate the trailer's identity with the message that it has just received. This association could be achieved, for example, simply by the fact that the message 830 was received over an IP connection that has been previously assigned to the asset tracking device of known identity.

Upon receiving the trigger message 830, the network server 814 may look up the trailer details at block 832 and determine the tractor associated with the trailer at block 834. Once the association is made, then the network server 814 may provide a message 840 to the tractor ITS unit 810 indicating the length of the trailer or the length of the combined vehicle, or the position of the back of the trailer at a given point in time. Other parameters might also be included for example, the width, height or other dimensions of the trailer or container. As will be appreciated by those in the art, message 840 may proceed through a plurality of servers before being reported to tractor ITS unit 810.

Once the tractor ITS unit 810 receives message 840, it may then use the length that was provided when generating future ITS messages, as shown by block 850.

In other cases, instead of waiting for a trigger message 830, network server 814 may include an association between an asset and a tractor. When that association changes then the steps at block 832 and 834 may be performed and the new length of the trailer may be provided to tractor ITS unit 810. For example, the configuration may be manually updated in an asset tracking system to associate a new trailer with the tractor.

In some cases, the updating may include a time at which the trailer is expected to be associated with that tractor. For example, the manual update may be a scheduling update for the tractor to pick up the trailer. In this case, the asset tracking system may know approximately when the tractor will pick up the trailer and convey this information. In other cases, the sending of the new association information may be delayed until the expected association time. In either case the position or length information is not used by the tractor unit in the generation of the V2X message until after the time at which the association between tractor and trailer is expected to, or is determined to have occurred. This determination may be made using a combination of determination that a coupling has occurred, where that coupling has occurred within a given time window of the a priori communicated expected time of coupling.

Figure 9:
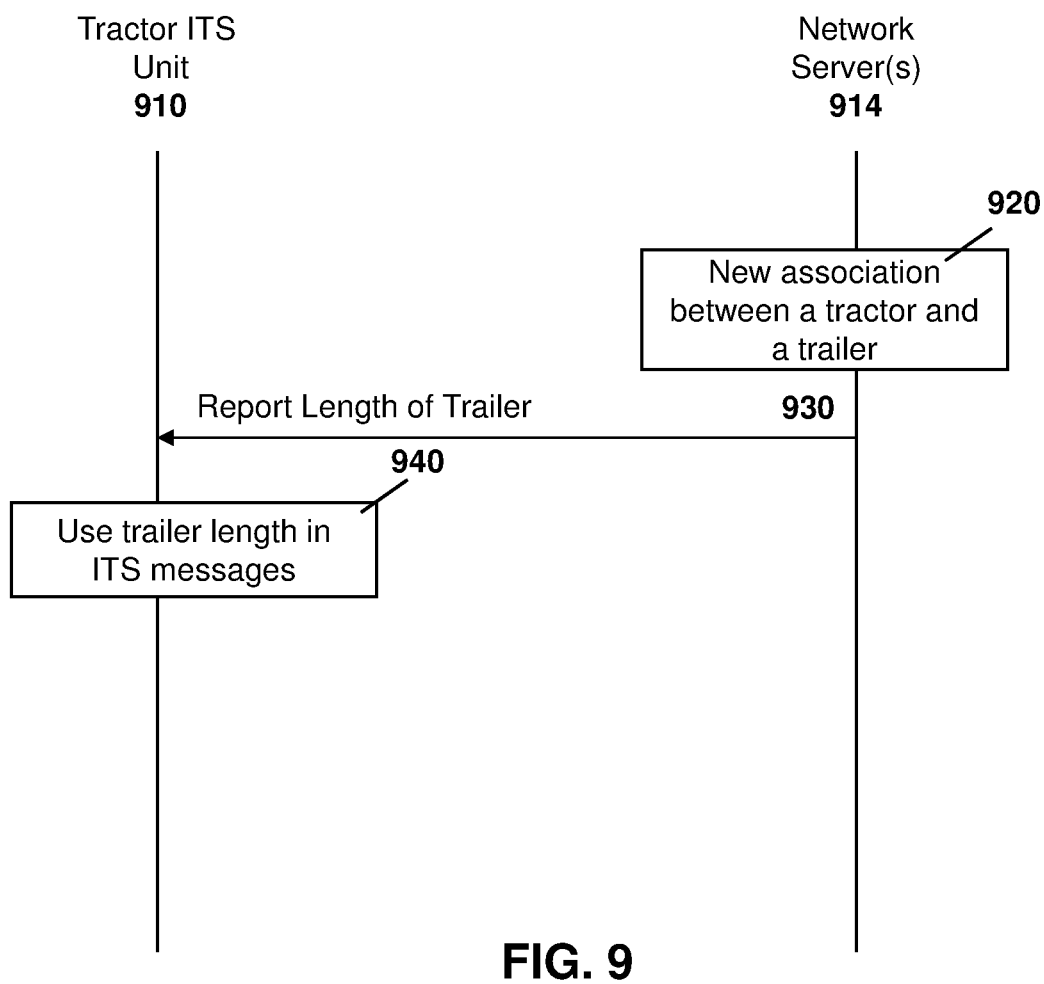
FIG. 9 is a dataflow diagram showing messaging and processes for one or more network servers to report a new vehicle length on association at an asset tracking system.

For example, reference is now made to FIG. 9. In the embodiment of FIG. 9, a network server 914 communicates with a tractor ITS unit 910.

At block 920, network server 914 finds a new association between a tractor and a trailer. The network server 914 may then provide a message 930 to the tractor ITS unit 910 to report the length of the trailer, or length of combined trailer and tractor, or position of back of trailer at a given point in time. As indicated above, message 930 may indicate a time that the expected association is supposed to happen or the sending a message 930 may be delayed until the association is expected to happen in some cases.

Once the tractor ITS unit 910 receives message 930, it may then use the length in ITS messages, as shown by block 940. If message 930 includes an expected time, then the use of the trailer length at block 940 may be delayed until such time. The position or length information is not used by the tractor unit in the generation of the V2X message until after the time at which the association between tractor and trailer is expected to, or is determined to have occurred. This determination may be made by the tractor unit using a combination of determination that a coupling event has occurred, where that coupling has occurred within a given time window of the a priori communicated expected time of coupling.

Multiple Trailers and Platooning

Figure 10:
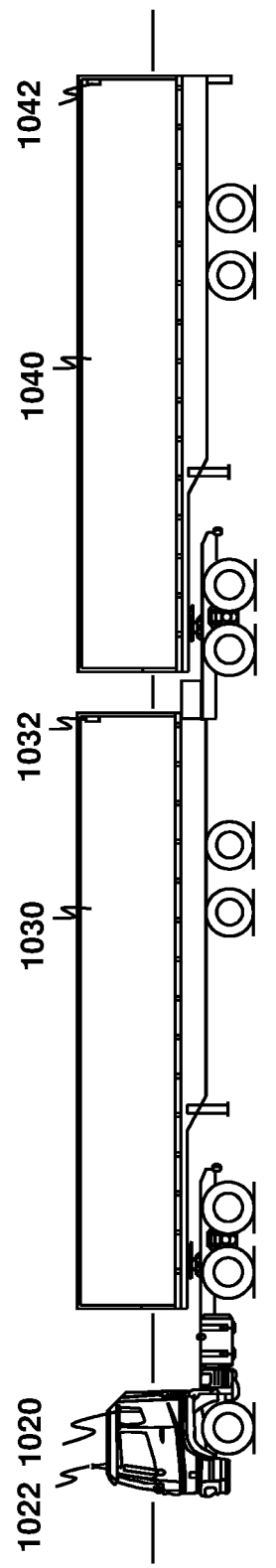
FIG. 10 is a side elevational view of a tractor towing two trailers.

In some cases, a tractor may tow a plurality of trailers. For example, reference is now made to FIG. 10. In the embodiment of FIG. 10, a tractor 1020 includes an ITS unit 1022.

The tractor 1020 is towing a first trailer 1030 having an asset tracking device 1032.

Further, a second trailer 1040 is being towed behind trailer 1030. The second trailer 1040 includes an asset tracking device 1042.

The vehicle length in this case should include the total length of the tractor and the two trailers.

Further, the use of ITS communications allows for a platooning. In particular, a platoon is a plurality of vehicles which may have a decreased distance between the vehicles to allow the vehicles to travel together for at least a portion of their journey. The ITS communications allow the following vehicles to know when a vehicle ahead of them is accelerating, breaking, turning, among other actions. The use of a platoon provides an efficient system to use road resources, potentially allow for fully autonomous vehicles, and may save fuel due to less air resistance for following vehicles, among other benefits.

Figure 11:
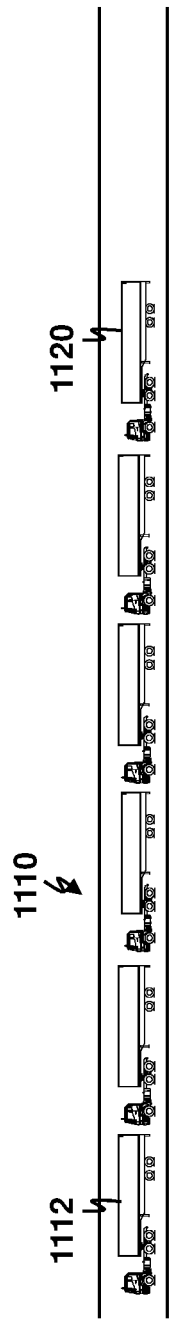
FIG. 11 is a side elevational view of a platoon of vehicles.

In some cases, V2X reporting may need to provide the length of the entire platoon rather than the individual vehicle. For example, referencing FIG. 11, a platoon 1110 includes a lead vehicle 1112 and an end vehicle 1120. The length reporting may need to include the length from the front of the tractor of lead vehicle 1110 to the rear of the trailer of end vehicle 1120.

In this case, the embodiments of FIGS. 6 to 9 above may be adapted to include a conflict resolution mechanism to ignore lengths reported by intermediate trailers or vehicles.

In particular, utilizing the embodiment of FIG. 6, tractor ITS unit 610 may receive position reports in messages 632 or 636 for the two trailers behind the tractor. In this case, the determining the combined length at block 642 may simply ignore the shorter length or closer position reported, and therefore use the longer length.

Similarly, in a platoon, the tractor ITS unit 610 may ignore the V2X messages from everything except for the end vehicle when making the length calculation at block 642.

In the embodiment of FIG. 7, if a plurality of trailers is being pulled by the tractor, each of the trailers would perform the calculations at blocks 722, 724, 726, 730 and 732. In this case, each of the trailers may provide a report to the tractor ITS unit 710. For example, the report may be found in messages 740 or 744. In this case, if trailers are providing their estimates of the length of the platoon then the tractor ITS unit 710 may ignore the shorter lengths and use the longest length reported. Alternatively, if trailers are providing position estimates made at given time instants then the tractor unit 710 may ignore positions that are the least far away and use only that position which is the furthest away. However, in this case, in order to avoid the middle trailer continually providing corrected length messaging, the tractor ITS unit 710 may signal to the trailer or asset tracking device 712 of the middle trailer to enter a sleep state. This may be done, for example, utilizing similar messaging to message 650 or messages 652 and 654 from the embodiment of FIG. 6.

For the embodiment of FIGS. 8 and 9, the network servers 814 or 914 may determine that the association is to a plurality of trailers and in this case, may provide the combined length in messages 840 or 930.

The above therefore provides for the correction of the reported length in ITS messaging to provide a more accurate "vehicle length" and therefore facilitate operation of the ITS system.

A server such as servers 340, 342 or 350, or central ITS subsystem 460, roadside ITS subsystem 440, vehicle ITS system 410, personal ITS subsystem 430, tractor ITS unit 610, network server 614, tractor ITS unit 710, network server 714, tractor ITS unit 810, network servers 814, tractor ITS unit 910, and/or network server 914, may be any network node. For example, one simplified network node that may perform the embodiments described above is provided with regards to FIG. 12.

Figure 12:
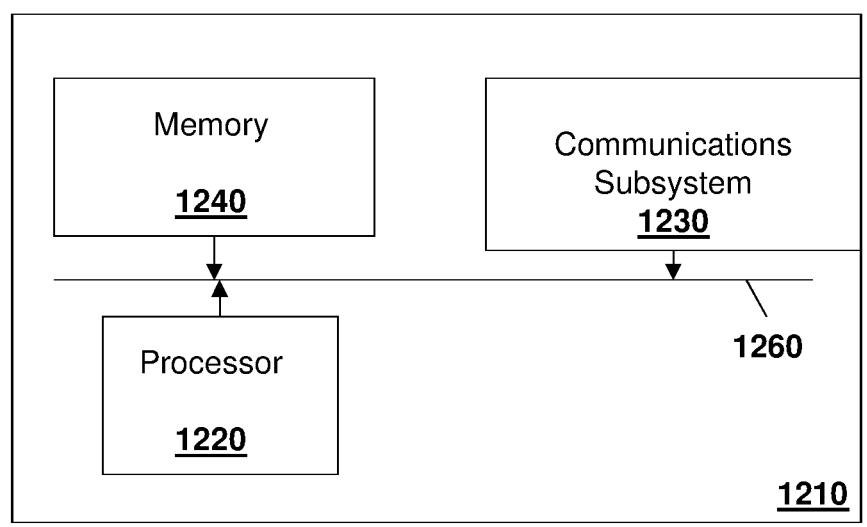
FIG. 12 is a block diagram of an example computing device or network node capable of being used with the embodiments of the present disclosure.

In FIG. 12, network node 1210 includes a processor 1220 and a communications subsystem 1230, where the processor 1220 and communications subsystem 1230 cooperate to perform the methods of the embodiments described herein.

The processor 1220 is configured to execute programmable logic, which may be stored, along with data, on the network node 1210, and is shown in the example of FIG. 12 as memory 1240. The memory 1240 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1220 may also be implemented entirely in hardware and not require any stored program to execute logic functions.

Alternatively, or in addition to the memory 1240, the network node 1210 may access data or programmable logic from an external storage medium, for example through the communications subsystem 1230.

The communications subsystem 1230 allows the network node 1210 to communicate with other devices or network elements.

Communications between the various elements of the network node 1210 may be through an internal bus 1260 in one embodiment. However, other forms of communication are possible.

The subject matter of the disclosure herein may also relate, among others, to the embodiments of the following clauses:

AA. A method at a first computing device within an Intelligent Transportation System for vehicle length reporting, the method comprising: receiving, at the computing device, a reported position from a second computing device; finding position information for the first computing device; calculating a difference between the position found for the first computing device and the position reported for the second computing device; and using the difference for vehicle length reporting.

BB. The method of clause AA, wherein the receiving is over a direct connection between the first computing device and the second computing device.

CC. The method of clause AA, wherein the receiving is through at least one network server.

DD. The method of any one of clauses AA to CC, wherein the calculating is performed by determining the position of the second computing device and the position of the first computing device within a threshold time of each other.

EE. The method of any one of clauses AA to DD, wherein the calculating is performed when the first computing device is stationary.

FF. The method of any one of clauses AA to EE, wherein the first computing device is associated with a tractor and the second computing device is associated with a trailer.

GG. The method of clause FF, wherein the using comprises sending a vehicle length over an Intelligent Transportation System message.

HH. The method of any one of clauses AA to EE, wherein the first computing device is associated with a trailer and the second computing device is associated with a tractor.

II. The method of clause HH, wherein the using compares a reported vehicle length and the calculated difference, and provides a corrected vehicle length to the tractor when the reported vehicle length and the calculated difference differ.

JJ. The method of any one of clauses AA to II, further comprising associating the tractor with the trailer at the first computing device.

KK. The method of any one of clauses AA to JJ, wherein the calculating is performed a plurality of times, and wherein the using uses one of a longest length or a most frequently found length.

LL. The method of any one of clauses AA to KK, further comprising: receiving a reported position from a third computing device; calculating a difference between the position found for the first computing device and the reported position of the third computing device; and ignoring the difference between the position found for the first computing device and the reported position of the third computing device when the difference is shorter than difference between the position found for the first computing device and the reported position of the second computing device.

MM. The method of any one of clauses AA to LL, wherein the position found or the reported position includes a position of a location receiving antenna plus an offset.

NN. A first computing device within an Intelligent Transportation System for vehicle length reporting, the first computing device comprising: a processor; and a communications subsystem, wherein the first computing device is configured to: receive a reported position from a second computing device; find position information for the first computing device; calculate a difference between the position found for the first computing device and the position reported for the second computing device; and use the difference for vehicle length reporting.

OO. The first computing device of clause NN, wherein the first computing device is configured to receive over a direct connection between the first computing device and the second computing device.

PP. The first computing device of clause NN, wherein the first computing device is configured to receive through at least one network server.

QQ. The first computing device of any one of clauses NN to PP, wherein the first computing device is configured to calculate by determining the position of the second computing device and the position of the first computing device within a threshold time of each other.

RR. The first computing device of any one of clauses NN to QQ, wherein the first computing device is configured to calculate when the first computing device is stationary.

SS. The first computing device of any one of clauses NN to RR, wherein the first computing device is associated with a tractor and the second computing device is associated with a trailer.

TT. The first computing device of clause SS, wherein the first computing device is configured to use by sending a vehicle length over an Intelligent Transportation System message.

UU. The first computing device of any one of clauses NN to RR, wherein the first computing device is associated with a trailer and the second computing device is associated with a tractor.

VV. The first computing device of clause UU, wherein the first computing device is configured to use a reported vehicle length and the calculated difference, and provides a corrected vehicle length to the tractor when the reported vehicle length and the calculated difference differ.

WW. The first computing device of any one of clause NN to VV, wherein the first computing device is further configured to associate the tractor with the trailer.

XX. The first computing device of any one of clauses NN to WW, wherein the first computing device is configured to calculate a plurality of times, and wherein the first computing device is configured to use one of a longest length or a most frequently found length.

YY. The first computing device of any one of clauses NN to XX, wherein the first computing device is further configured to: receive a reported position from a third computing device; calculate a difference between the position reported for the first computing device and the reported position of the third computing device; and ignore the difference between the position reported for the first computing device and the reported position of the third computing device when the difference is shorter than difference between the position found for the first computing device and the reported position of the second computing device.

ZZ. The first computing device of any one of clauses NN to YY, wherein the position found or the reported position includes a position of a location receiving antenna plus an offset.

AAA. A computer readable medium for storing instruction code which, when executed by a processor of a first computing device within an Intelligent Transportation System for vehicle length reporting cause the first computing device to: receive a reported position from a second computing device; find position information for the first computing device; calculate a difference between the position found for the first computing device and the position reported for the second computing device; and use the difference for vehicle length reporting.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a first computing device within an Intelligent Transportation System for vehicle length reporting, the method comprising:
   receiving, at the first computing device, a reported position from a second computing device;
   finding position information for the first computing device from a position sensor;
   determining that a time stamp for the reported position from the second computing device, and a time stamp for the position information for the first computing device are within a threshold time of each other;
   calculating a difference between the position found for the first computing device and the position reported from the second computing device; and
   using the difference for vehicle length reporting.

2. The method of claim 1, wherein the receiving is over a direct connection between the first computing device and the second computing device.

3. The method of claim 1, wherein the receiving is through at least one network server.

4. The method of claim 1, wherein the calculating is performed when the first computing device is stationary.

5. The method of claim 1, wherein the first computing device is associated with a tractor and the second computing device is associated with a trailer.

6. The method of claim 5, wherein the using comprises sending a vehicle length over an Intelligent Transportation System message.

7. The method of claim 1, wherein the first computing device is associated with a trailer and the second computing device is associated with a tractor.

8. The method of claim 7, wherein the using compares a reported vehicle length and the calculated difference, and provides a corrected vehicle length to the tractor when the reported vehicle length and the calculated difference differ.

9. The method of claim 1, further comprising associating the tractor with the trailer at the first computing device.

10. The method of claim 1, wherein the calculating is performed a plurality of times, and wherein the using uses one of a longest length or a most frequently found length.

11. The method of claim 1, further comprising:
    receiving a position from a third computing device;
    calculating a difference between the position found for the first computing device and the reported position of the third computing device; and
    ignoring the difference between the position found for the first computing device and the reported position of the third computing device when the difference is shorter than the difference between the position found for the first computing device and the reported position from the second computing device.

12. The method of claim 1, wherein the position found or the reported position includes a position of a location receiving antenna plus an offset.

13. A first computing device within an Intelligent Transportation System for vehicle length reporting, the first computing device comprising:
    a processor; and
    a communications subsystem,
    wherein the first computing device is configured to:
      receive a reported position from a second computing device;
      find position information for the first computing device from a position sensor;
      determine that a time stamp for the reported position from the second computing device, and a time stamp for the position information for the first computing device are within a threshold time of each other;
      calculate a difference between the position found for the first computing device and the position reported from the second computing device; and
      use the difference for vehicle length reporting.

14. The first computing device of claim 13, wherein the first computing device is configured to receive over a direct connection between the first computing device and the second computing device.

15. The first computing device of claim 13, wherein the first computing device is configured to receive through at least one network server.

16. The first computing device of claim 13, wherein the first computing device is configured to calculate when the first computing device is stationary.

17. The first computing device of claim 13, wherein the first computing device is associated with a tractor and the second computing device is associated with a trailer.

18. The first computing device of claim 17, wherein the first computing device is configured to use by sending a vehicle length over an Intelligent Transportation System message.

19. The first computing device of claim 13, wherein the first computing device is associated with a trailer and the second computing device is associated with a tractor.

20. The first computing device of claim 19, wherein the first computing device is configured to use a reported vehicle length and the calculated difference, and provides a corrected vehicle length to the tractor when the reported vehicle length and the calculated difference differ.

21. The first computing device of claim 13, wherein the first computing device is further configured to associate the tractor with the trailer.

22. The first computing device of claim 13, wherein the first computing device is configured to calculate a plurality of times, and wherein the first computing device is configured to use one of a longest length or a most frequently found length.

23. The first computing device of claim 13, wherein the first computing device is further configured to:
    receive a reported position from a third computing device;
    calculate a difference between the position found for the first computing device and the reported position of the third computing device; and
    ignore the difference between the position found for the first computing device and the reported position of the third computing device when the difference is shorter than the difference between the position found for the first computing device and the reported position from the second computing device.

24. The first computing device of claim 13, wherein the position found or the reported position includes a position of a location receiving antenna plus an offset.

25. A non-transitory computer readable medium for storing instruction code which, when executed by a processor of a first computing device within an Intelligent Transportation System for vehicle length reporting cause the first computing device to:
    wherein the first computing device is configured to:
      receive a reported position from a second computing device;

find position information for the first computing device from a position sensor;
determine that a time stamp for the reported position from the second computing device, and a time stamp for the position information for the first computing device are within a threshold time of each other;
calculate a difference between the position found for the first computing device and the position reported from the second computing device; and
use the difference for vehicle length reporting.

* * * * *